(12) United States Patent
Chabbott (10) Patent No.: US 9,619,745 B1
(45) Date of Patent: Apr. 11, 2017

(54) JEWELRY STRUCTURE FOR INCORPORATING NFC TAGS

(71) Applicant: Dasan, Inc., New York, NY (US)

(72) Inventor: Julien D. Chabbott, New York, NY (US)

(73) Assignee: Dasan, Inc., New York, NY (US)

( * ) Notice: Subject to any disclaimer, the term of this patent is extended or adjusted under 35 U.S.C. 154(b) by 0 days.

(21) Appl. No.: 15/232,423

(22) Filed: Aug. 9, 2016

Related U.S. Application Data

(60) Provisional application No. 62/207,090, filed on Aug. 19, 2015.

(51) Int. Cl.
| | |
|---|---|
| *G06K 19/077* | (2006.01) |
| *H04B 5/02* | (2006.01) |
| *H04B 1/3827* | (2015.01) |
| *H04M 1/725* | (2006.01) |
| *G06K 19/07* | (2006.01) |
| *A44C 25/00* | (2006.01) |

(52) U.S. Cl.
CPC ...... *G06K 19/07762* (2013.01); *A44C 25/002* (2013.01); *G06K 19/0727* (2013.01); *H04B 1/385* (2013.01); *H04B 5/02* (2013.01); *H04M 1/7253* (2013.01)

(58) Field of Classification Search
None
See application file for complete search history.

(56) References Cited

U.S. PATENT DOCUMENTS

2015/0294214 A1 * 10/2015 Boulby ............ G06K 19/07758
340/10.6

* cited by examiner

*Primary Examiner* — Kristy A Haupt
(74) *Attorney, Agent, or Firm* — Levisohn Berger LLP (57) ABSTRACT

This invention is a jewelry locket having an NFC chip which is capable of transmitting digital content to a smart phone by retrieving information from the NFC chip with the NFC chip housed within a metal jewelry structure having an internal compartment fixedly holding the NFC chip sufficiently away from the walls to permit wireless transmission between the chip and a smart phone.

15 Claims, 7 Drawing Sheets

JEWELRY STRUCTURE FOR INCORPORATING NFC TAGS

RELATED APPLICATION

In accordance with the requirements of 35 U.S.C. 119(e) or 120, and 37 CFR 1.78, Applicant claims the benefit of U.S. Prov. Appl. Ser. No. 62/207,090, filed on Aug. 19, 2015, the disclosures of which are incorporated herein by reference in their entirety.

BACKGROUND OF THE INVENTION

Jewelry has traditionally had lockets or closed compartments in which special photographs, images or keepsakes are maintained. Such compartments are generally integrally formed within the jewelry which is often worn as a pendant or necklace with mechanical structure allowing doors, gates or windows to be open to access the photos or allow retrieval of material stored within the compartments.

The photo or photos stored in such personal lockets worn by people do not change. It can only be viewed by a person in physical proximity to the locket and there is a limited ability to change the photo(s). Indeed, when photos are changed, old photos are often discarded and replaced with new ones. The ability to update, store or otherwise provide a significant amount of photos or other desirable viewable content is unavailable with current jewelry structures.

Modern technology has developed near field communication (NFC) chips which include a set of protocols enabling smartphones and other devices to establish radio communication with each other by touching the devices together or bringing them into proximity to a distance of typically four inches or less, as currently designed. Currently, such devices are made of non-conductive material, and the NFC chip is snugly held in place within the device to minimize wasted space.

NFC employs electromagnetic induction between two loop antenna to exchange information between the devices. Data in NFC tags typically are read only, but some also are rewritable. The material in which such NFC chips are snugly held is non-conductive, such as plastic or composite materials.

An object of this invention is to provide decorative jewelry housing keepsake items where the keepsake items are easily viewable, susceptible to change and storage and retrieval of a large amount of viewable content, such as images, videos, data or the like.

Another object of this invention is to provide such a jewelry item which is made of precious metal, such as gold or silver, which holds an NFC chip without significantly impairing the radio frequency (RF) transmission of the NFC chip.

Yet another object of this invention is to provide a metal structure having a compartment within which an NFC chip may be fixed in place, yet be able to use the metal structure with the NFC chip with smart phones and the like.

Other objects, advantages and features of this invention will become more apparent from the following description.

SUMMARY OF THE INVENTION

This invention is directed to a personal jewelry item capable of being worn and housing an NFC device. The NFC device incorporated in the present invention has a ferrite material with the chip having a ferrite casing and a silicone glue to be able to be used. The ferrite casing is metal and is suitable to be a part of a jewelry item. The ferrite material minimally adversely impacts RF transmission.

The NFC device sits within a metal compartment and is separated from the walls of the compartment, allowing for a cushion material to be placed therein while still permitting effective RE transmission.

Typically, the NFC device will work with an app to a smartphone when the jewelry is placed in close proximity to the smartphone carrying the app. This will be explained in more detail below. Bluetooth may be the communication protocol or other communication protocols may be provided.

In use, this invention appears to be an ordinary attractive pendant, but the pendant is constructed so as to enable the NFC chip to be housed within a compartment in a secure manner which enables the chip to securely remain in place while storing and displaying content such as photos, videos, voice clips, GPS locations, birthday reminders, etc.

DESCRIPTION OF THE DRAWINGS

FIG. 1A is a front plan view of a pendant of this invention on a chain while

DETAILED DESCRIPTION OF THE PREFERRED EMBODIMENT

Figure 1A:
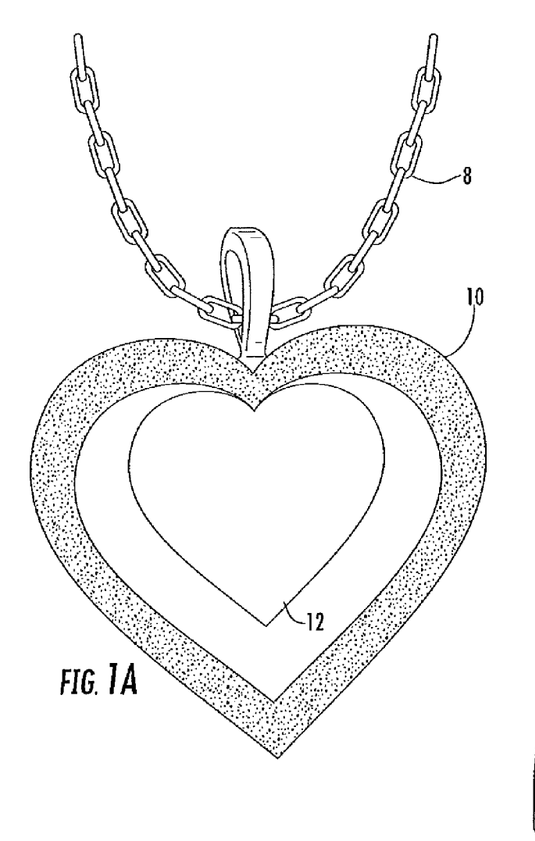
Figure 1B:
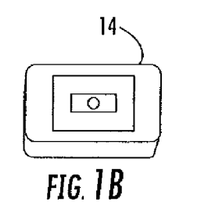
FIGS. 1B and 1C are perspective views of an NFC chip and of a rear cover holding the NFC within the rear compartment of the pendant.
Figure 1C:
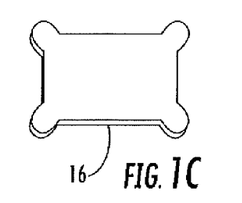

FIG. 1A shows a heart shaped pendant 10 containing a center heart-shaped jewelry locket 12 shown from the front. The jewelry locket is closed without being able to be opened from the front, although one could place a false door in the front of the locket. A separate NFC chip 14 is shown in FIG. 1B as is a separate cover 16 in FIG. 1C for holding the chip in place. The pendant 10 may be carried on a chain 8.

Figure 2A:
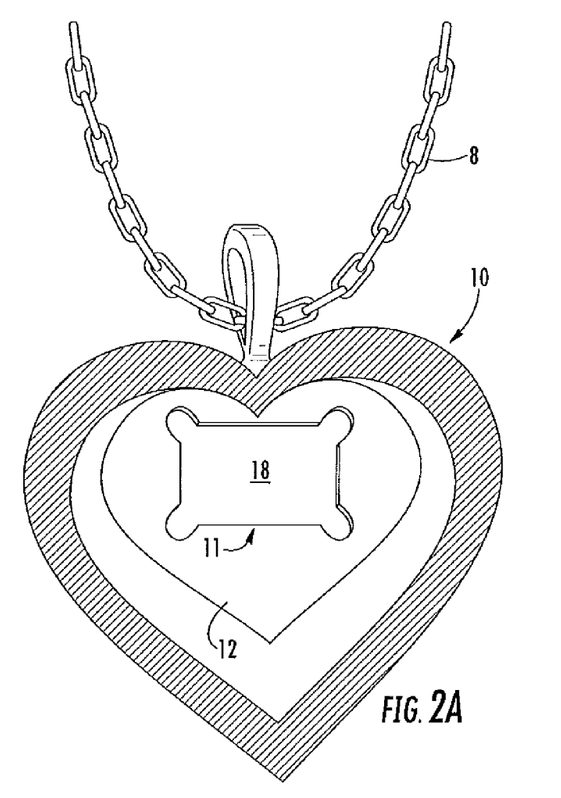
FIG. 2A is a rear plan view of this invention showing the metal housing and compartment into which the NFC chip is placed.
Figure 2B:
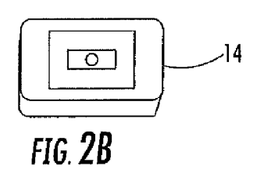
FIG. 2B is a perspective view of the NFC chip.

FIG. 2A is a rear plan view of the pendant of FIG. 1A and shows the open rear 11 of jewelry locket 12 with the chip 14 and cover 16 shown as FIGS. 2A and 2B separated from locket 12. A recess or rear compartment 18 is formed in the rear 11 of the locket 12.

Figure 2C:
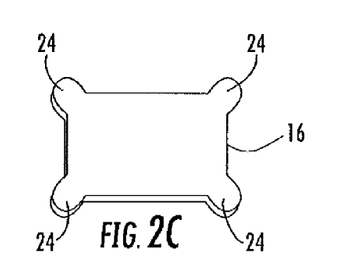
FIG. 2C is a cover.
Figure 3:
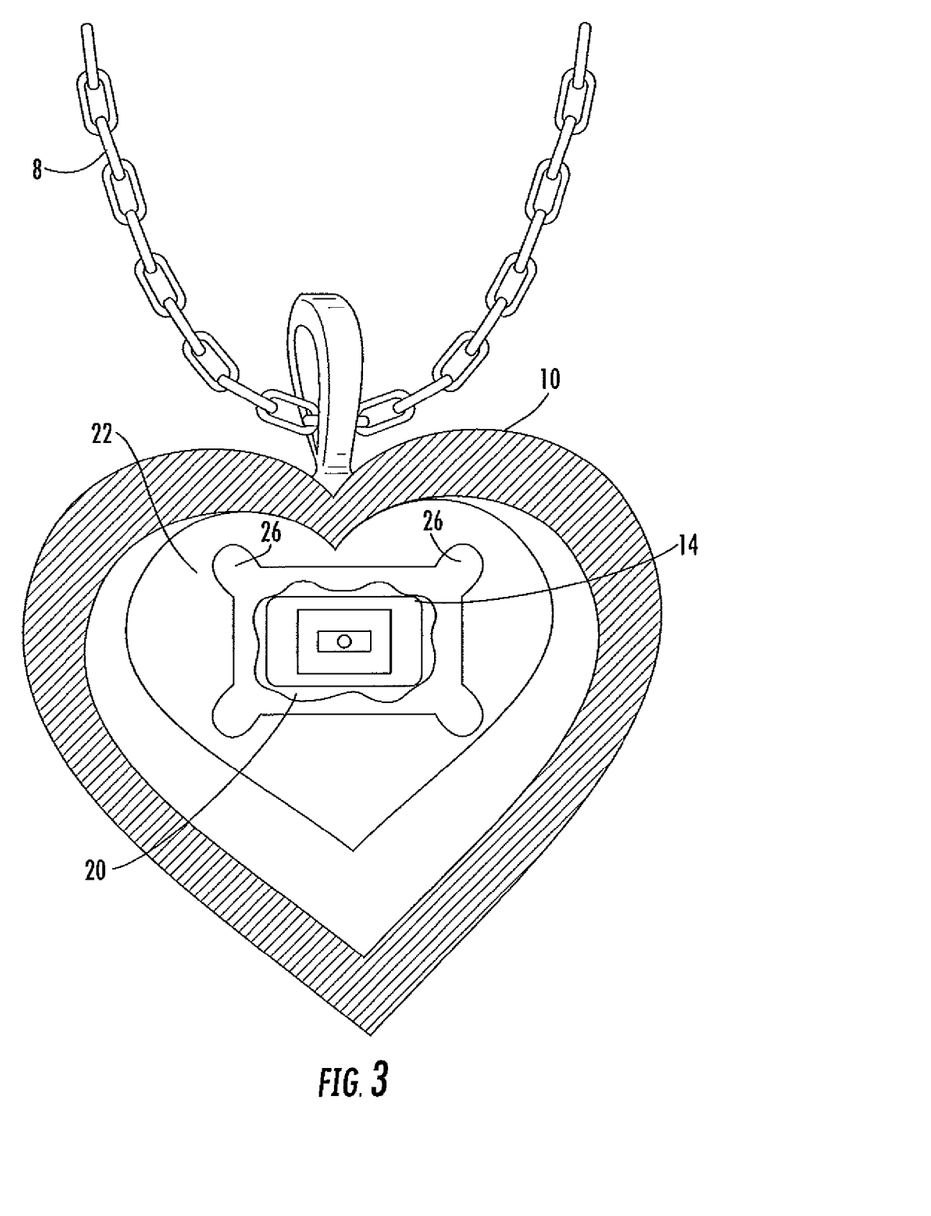
FIG. 3 is another rear plan view of this invention showing the NFC chip within the compartment.

FIG. 3A is another rear plan view of the heart of FIG. 1A showing the NFC chip 14 secured in place by an epoxy or other adhesive material attaching chip 14 in compartment 18. There may be a cushioning material 20 provided between the chip 14 and walls 25 (see FIG. 5) of the compartment 18 so as to ensure secure attachment and impact minimization of the chip 14. Cover 16 shown in FIG.

Figure 4:
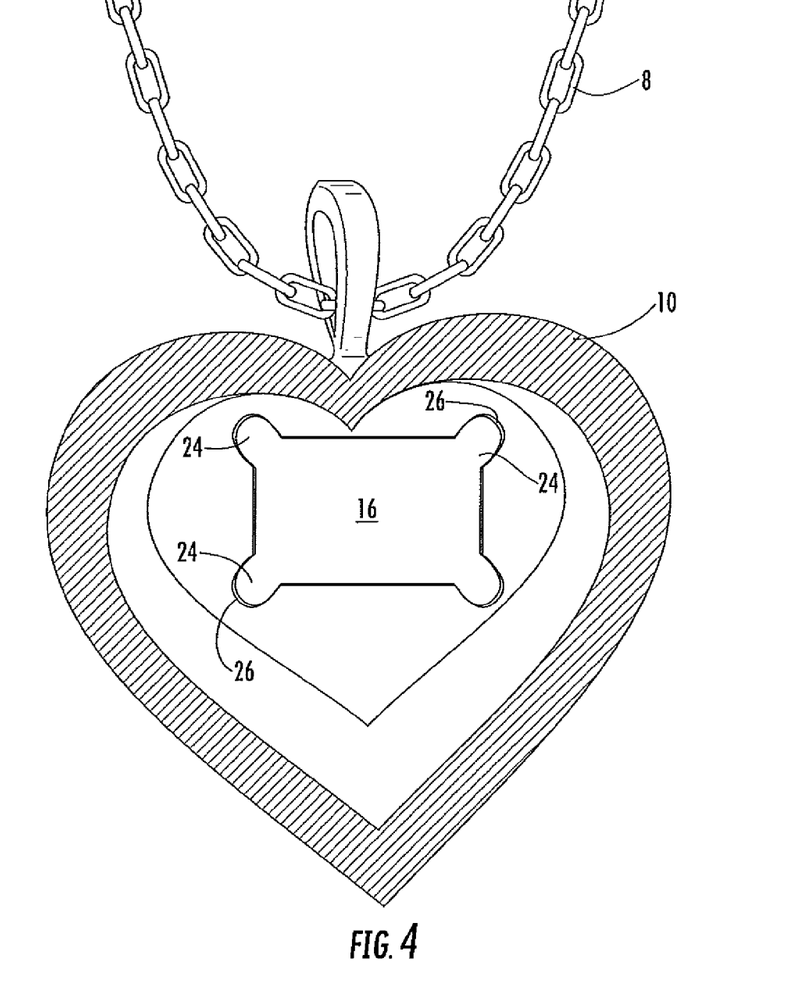
FIG. 4 is a rear plan view of the locket of this invention with the rear cover in place.

2C fits on the rear 22 of the locket 12 to secure the chip in place with the dog ears 24 of the cover 16 fitting into the dog ear recesses 26 in the corners of the rear of the locket 12 as shown in FIG. 4.

FIG. 4 is a rear plan view of this invention similar to FIG. 3A but showing the cover 16 in place holding the chip so as to be shock resistantly held in place and effectively operate. Cover 16 is flush with the rear surface of rear 22.

Figure 5:
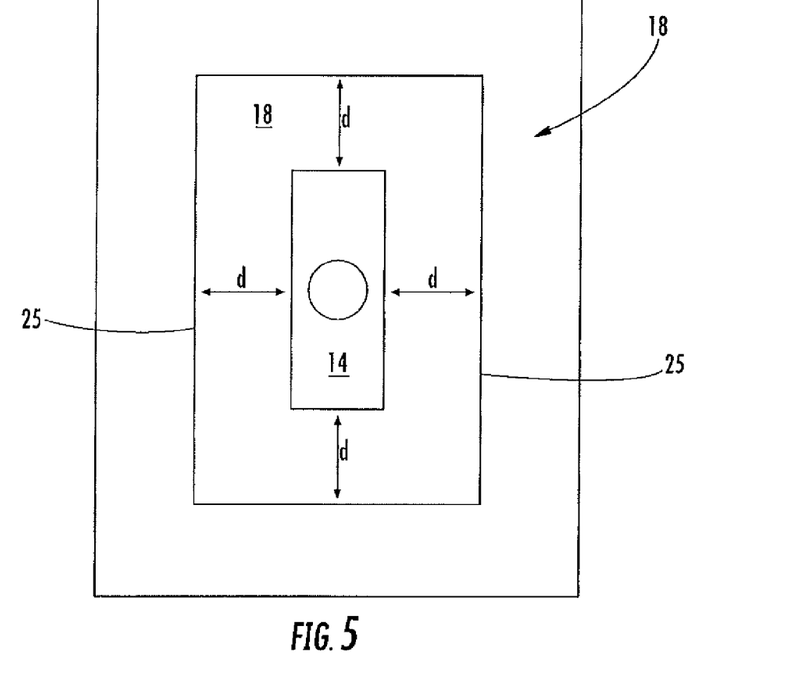
FIG. 5 is a top plan view of an NFC chip within the compartment with dimensions between the NFC chip and walls of the compartment illustrated by the letter "d"
Figure 6:
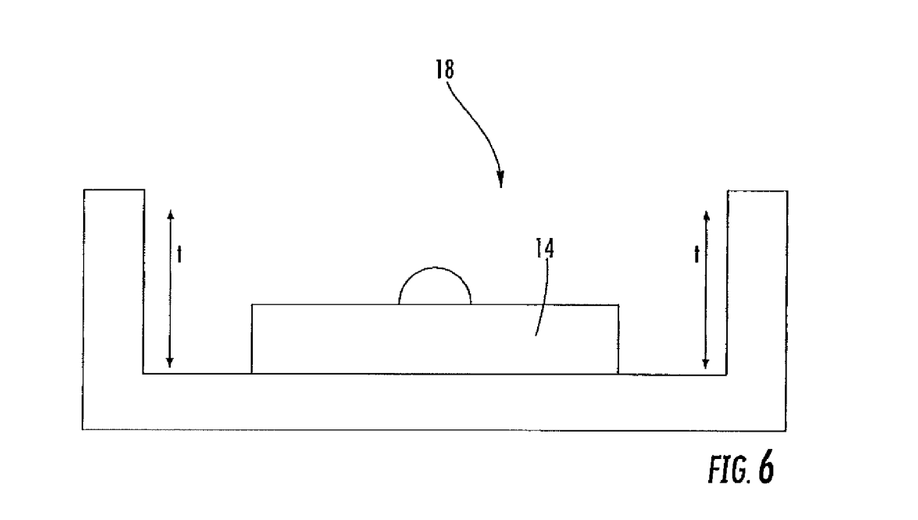
FIG. 6 is a side view of the compartment in which the NFC chip is secured.

FIG. 5 is a top view of compartment 18 with NFC chip 14 therein, while FIG. 6 is a side view of the compartment 18 and chip 14 therein. Dimensions "d" in FIG. 5 are representative of the dimensional distance between the chip 14 and the side walls 25 of the compartment while dimension "t" is representative of the height of the walls 25 of the compartment in relation to chip 14.

Figure 7A:
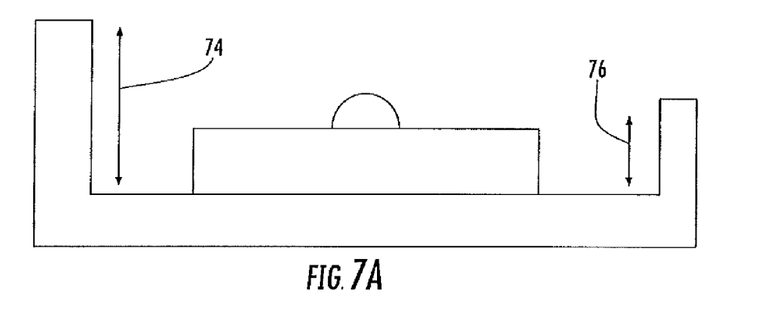
FIGS. 7A, 7B and 7C are a side and two top views respectively of alternative dimensional arrangements or cutouts of the compartment walls.
Figure 7B:
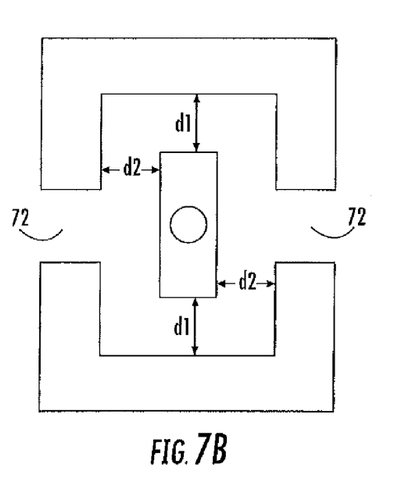
Figure 7C:
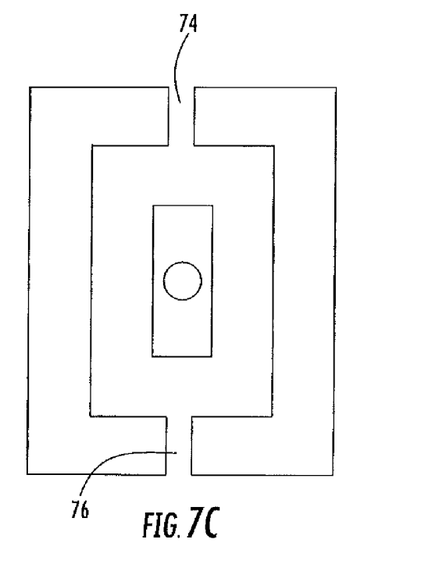

FIGS. 7A, 7B and 7C are alternative dimensional arrangements as well as cut-outs for the walls of the compartment 18, all of which may be adjusted and otherwise changed to produce the most effective RF transmission considering that the NFC chip is sitting within a jewelry item made of precious metal, and the walls of the compartment are formed of such precious metal as well.

As a preferred embodiment of this invention, a preferred distance "d" is 2 mm and a preferred height "t" is 4 mm. Additionally, cut-outs 74 and 76 shown in FIGS. 7B and 7C may also improve the RF transmission characteristics as well as changing the height of the walls 74 and 76 so that they are not equal as shown in FIG. 7A.

This invention may be used with or without the cushioning material 20, as described above.

Figure 8:
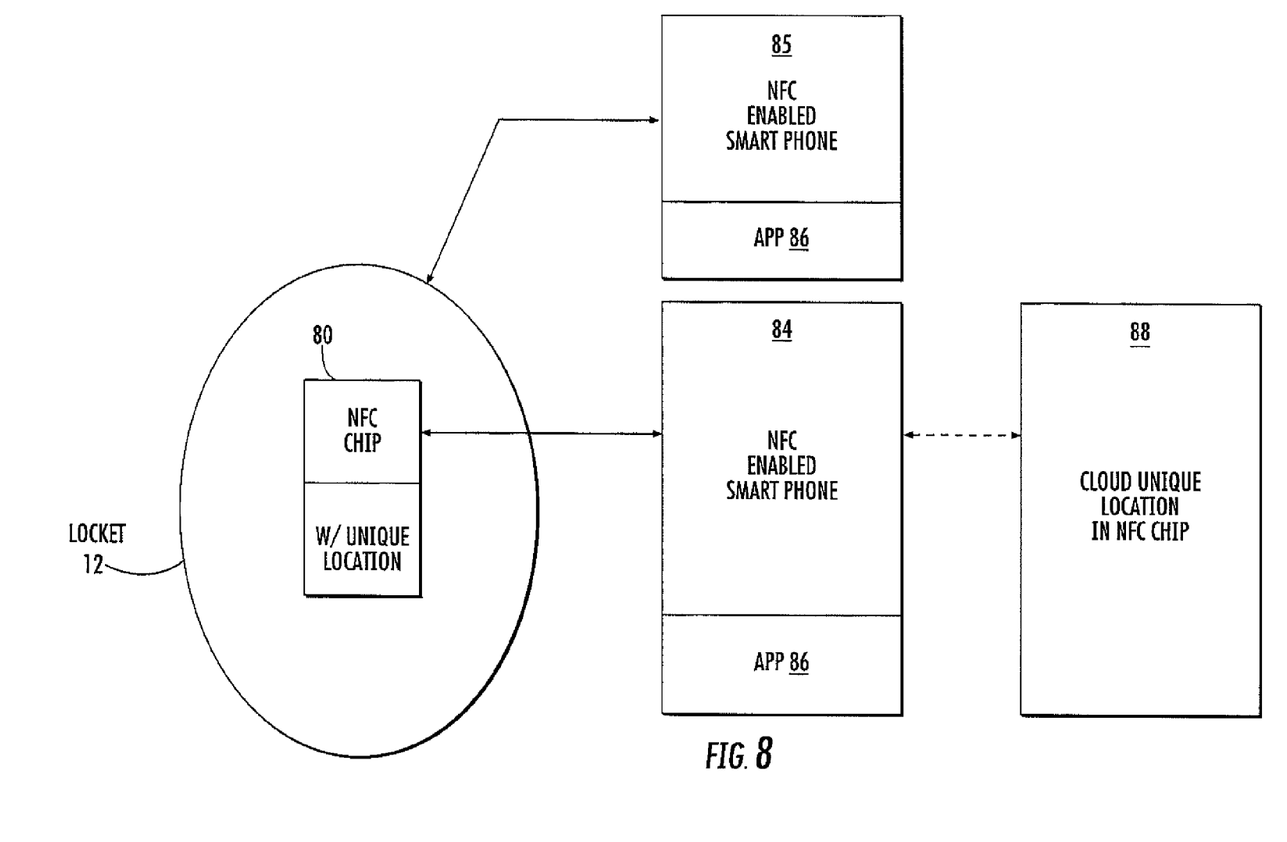
FIG. 8 is a block diagram showing the system architecture of an embodiment of the invention including a smart phone, and NFC chip and a cloud storage system.

FIG. 8 is a block diagram of showing the system architecture of an embodiment of the invention which includes smartphones, an NFC chip and cloud storage system. An NFC chip 80 is embodied in locket 12 as described above. The NFC chip could be an MBT tag made by Toda Kogyo Corp. of Japan. An NFC enabled smartphone 84 has a preloaded software application ("app") 86 which associates the NFC chip with a unique location in a cloud storage system 88 having the unique location associated with the specific NFC chip.

In use, the recipient taps his/her smartphone 85 against locket 12 to establish an NFC link, and the smartphone then reads the NFC code which directs App 86 to connect smartphone 85 to the same cloud location related to that NFC code which was originally set when smartphone 84 was first tapped against locket 12. Thus smartphone 84 is linked to the specific cloud storage location where the stored media can be accessed and displayed on smartphone 85 which was originally set by smartphone 84.

The system works as follows: a person seeking to buy a special jewelry gift arranges to have an app 86 downloaded to the smartphone of the recipient of the gift. The app communicates with the NFC chip 80 when the chip is brought into sufficient proximity with the smartphone so as to read a unique code or identifier from the NFC chip 80. Once the unique code is read, the app 86 to provides access to a cloud location associated with that unique code. The purchaser of the gift also has access to the unique identifier associated with the NFC chip. Thus, the purchaser (e.g. a spouse) may upload photos and other content to a cloud location identified by the shared unique identifier and display the content on the screen of the smartphone. When the gift recipient taps her smartphone 85 to the locket 12, the app 86 will automatically associate her phone with the cloud location that is populated by content, such as photos uploaded by the gift purchaser.

Content in the unique cloud location can be uploaded by the party or parties who want to upload media to that cloud location.

Any NFC chip enabled smartphone could tap any item of jewelry containing an NFC chip with a preloaded unique cloud location and have direct access to that cloud location to download the media stored in that cloud location onto the NFC chip enabled smartphone.

This invention will find great appeal to those non-technical individuals who, by merely tapping their smartphone to a jewelry locket carried on a pendant or the like then has access to all the content seemingly magically carried to the smartphone by the locket without the recipient having to do anything more than tap the NFC enabled smartphone to the jewelry item containing the NFC chip.

The overall objective of this invention is to allow traditional jewelry wearers who may not be technically proficient enough to employ modern technology to use a special locket that appears to carry an enormous amount of content that can be seen on the screen of a smartphone.

The NFC chip, itself, can store media, but media storage on such chips is extremely limited.

It is a further object of this invention to provide access to media stored in a cloud specifically associated with an NFC chip which has a unique cloud location associated with that chip.

To the user, it appears as though the locket contains unlimited media that can be shown on a person's smartphone. In reality, this invention provides for communication between a person's smartphone, which is NFC enabled and which has had an app downloaded to work with NFC devices, so that a unique location correlated with the specific NFC chip will be transmitted to the smartphone which then provides direct access through the app to the cloud in which the unlimited content can be accessed and viewed through the user's smartphone.

This invention may be used with any metal device, especially any jewelry item that can take advantage of the present invention.

This invention provides a unique combination of an NFC chip housed within metal, preferably precious metal, but so located as to provide sufficient distance between the walls of the NFC chip and the walls of a metal compartment in which the NFC chip sits. The distances between the perimeter of the chip and the walls of the compartment or the structure of the walls themselves can be designed to enable RF transmission without serious degradation of the transmission characteristics. Preferred embodiments are described in this patent application.

It should be understood that the preferred embodiment was described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly legally and equitably entitled.

The invention claimed is:

1. A jewelry locket made of metal comprising:
   a jewelry item having a design,
   said jewelry item having an enclosed internal compartment which has a floor and a wall,
   a wireless transmitter/receiver held within said compartment, said wireless/transmitter/receiver fixedly secured in place on said floor within said compartment, said wall surrounding said wireless transmitter/receiver, said wireless transmitter/receiver being separated by a distance d from said wall, said wireless transmitter/receiver transmitting and receiving while enclosed within said compartment, said wireless transmitter/receiver comprising an NFC chip, said distance d being at least great enough to permit effective transmission and reception for said wireless transmitter/receiver while enclosed within said compartment.

2. A jewelry locket as in claim 1, wherein said NFC chip is rectangular in shape and said compartment is rectangular in shape, said distance d comprising distances d1 and d2 whereby distance d1 is the distance from opposite sides of said chip to respective opposite sides of said rectangular compartment and distance d2 is the distance from opposite ends of said chip to respective opposite end walls of said rectangular compartment.

3. A jewelry locket as in claim 2, wherein said distances d1 and d2 are equal.

4. A jewelry locket as in claim 2, wherein distances d1 and d2 are unequal.

5. A jewelry locket as in claim 2, wherein distances d1 from the opposite sides of said chip to respective side walls of said rectangular compartment are unequal.

6. A jewelry locket as in claim 2, wherein distances d2 from the opposite ends of said chip to respective end walls of said rectangular compartment are unequal.

7. A jewelry locket as in claim 2, wherein d1 and d2 are each approximately 2 mm.

8. A jewelry locket as in claim 2, wherein the height of said side walls of said rectangular compartment is approximately 4 mm.

9. A jewelry locket as in claim 2, wherein said walls of said compartment comprise at least one cut-out.

10. A jewelry locket as in claim 1, wherein said chip is round and centrally located within said compartment.

11. A jewelry locket as in claim 10, wherein said walls of said rectangular compartment are of equal height.

12. A jewelry locket as in claim 10, wherein said walls of said rectangular compartment are of unequal height.

13. A jewelry locket as in claim 1, wherein said wireless transmitter/receiver comprises an NFC chip.

14. A jewelry locket as in claim 13, wherein said NFC chip communicates with said smart phone to enable selected digital media to appear on said smart phone.

15. A jewelry locket as in claim 1, further comprising a separate smart phone, said smart phone communicating with said wireless transmitter/receiver.

* * * * *